United States Patent Office 3,339,799
Patented Sept. 5, 1967

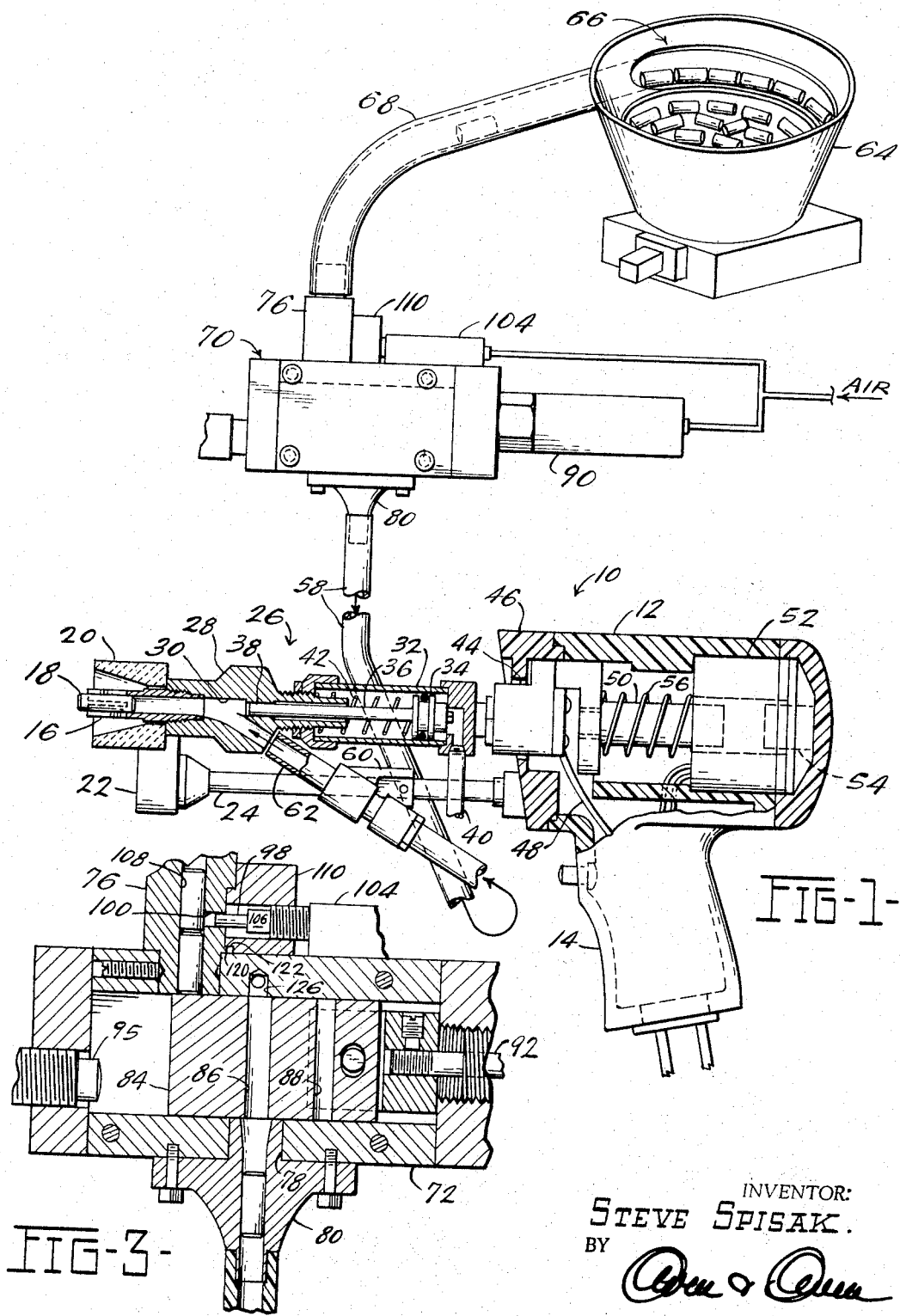

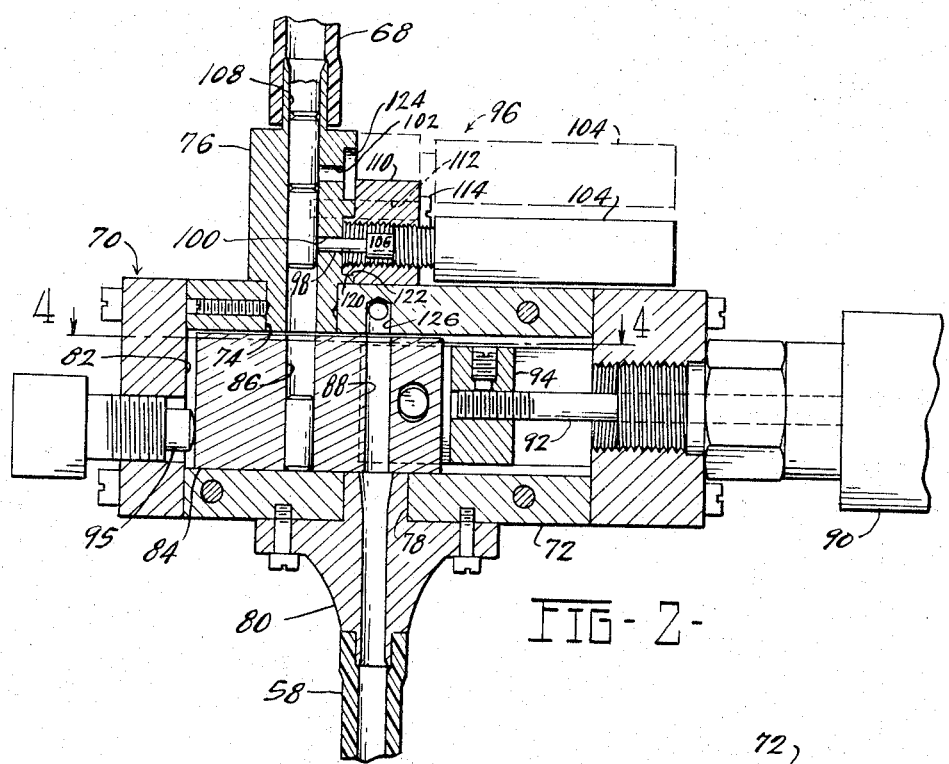
FIG-2-
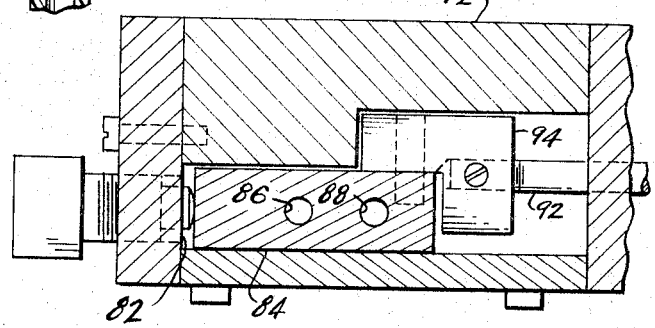
FIG-4-
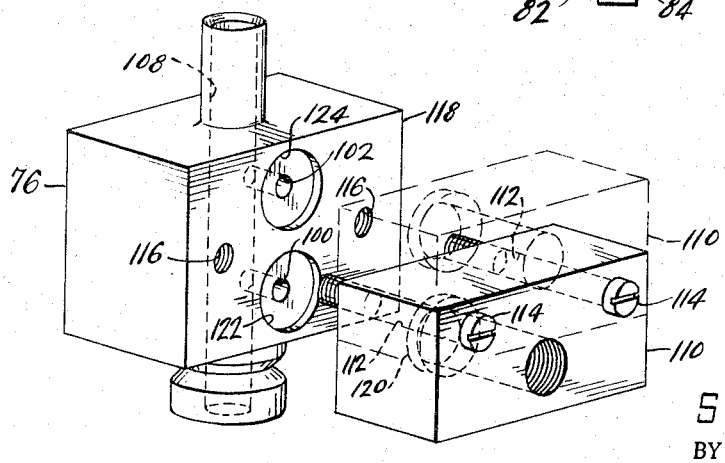
FIG-5-
INVENTOR:
STEVE SPISAK.
BY
ATT'YS.

3,339,799
FASTENER FEED ASSEMBLY INCLUDING FASTENER SIZE ADJUSTING MEANS
Steve Spisak, Elyria, Ohio, assignor to Gregory Industries, Inc., Lorain, Ohio, a corporation of Michigan
Filed Sept. 7, 1965, Ser. No. 485,518
3 Claims. (Cl. 221—176)

This invention relates to stud welding and to apparatus for feeding studs or fasteners one at a time to a chuck of a welding or fastening tool.

Stud welding tools for end welding various types of studs to workpieces are in common use and are being used more frequently in mass production where a large number of studs are welded over the period of a day. In the operation of a stud welding tool, the loading of the stud can be time consuming and can constitute a large part of the time required for the overall welding operation. The stud first must be grasped by the operator, then oriented to a predetermined position, aligned with the chuch of the welding tool which is to hold the stud during welding, and finally inserted into the chuck. The studs preferably are arc welded by the technique disclosed in Nelson Patent 2,191,494 or in Glorioso Patent 3,136,880. However, the studs also can be welded by the technique disclosed in Graham Patent 2,610,278 or by resistance welding, by way of further example.

In one commonly-used welding cycle performed with an arc welding tool, the stud is first pressed against the workpiece to place it in good electrical contact therewith and the trigger of the tool is then actuated to cause the stud to be withdrawn from the workpiece to a retracted position. The stud is held in the retracted position for a short period of time, after which it is plunged against the workpiece. Frequently, a pilot arc is first initiated as the stud is withdrawn, after which a main welding arc is struck. The main welding arc is struck while the stud is retracted or as it begins to plunge, thereby forming pools of molten metal on the stud and workpiece which unite and solidify after the stud is plunged against the workpiece. The tool is then manually withdrawn from the now-welded stud to separate it from the chuck.

The present invention relates to a loading device for supplying studs one at a time to a stud welding tool for decreasing the time required to load the studs in the chuck of the tool. By decreasing the loading time, the overall welding cycle can be substantially shortened. The loading device according to the invention includes an escapement mechanism by means of which the studs are fed from a supply source one at a time to a conveying tube from which the studs are individually conveyed to the chuck of the tool. When the stud is in the chuck, a piston located behind the chuck is moved forwardly to move the stud forwardly and support it in proper position in the chuck during the welding operation.

In particular, the escapement according to the invention is uniquely designed to handle studs of different lengths without requiring extensive changes or modifications. This is particularly advantageous where the tool is to be used to apply fasteners to different products so that studs of one size might be used for a period of time and then studs of a different size used for another period of time. However, the escapement even can handle different length studs at the same time and in any order or sequence.

It is, therefore, a principal object of the invention to provide a loading system for supplying different length fasteners to a tool.

Another object of the invention is to provide an escapement mechanism which can accommodate studs of different lengths for feeding them one at a time to a welding tool.

Other objects and advantages of the invention will be apparent from the following detailed description of a preferred embodiment thereof, reference being made to the accompanying drawings, in which:

FIG. 1 is a schematic, overall view of a stud welding tool and a loading system therefor, with parts broken away and with parts in cross section;

FIG. 2 is a view in vertical cross section of an escapement mechanism of the loading system of FIG. 1;

FIG. 3 is a fragmentary view similar to FIG. 2 but showing components of the escapement mechanism in a different position;

FIG. 4 is a fragmentary view in horizontal cross section taken along the line 4—4 of FIG. 2; and FIG. 5 is a view in perspective of part of the escapement mechanism showing a component in an alternate position in dotted lines.

Referring particularly to FIG. 1, a welding tool of the general type to which the studs are fed is indicated at 10 and is designed for welding a stud by a drawn arc technique. The tool includes means for retracting the stud from a surface of a workpiece, means for holding the stud in the retracted position, and means for moving the stud toward and against the workpiece after a predetermined period. The stud welding tool 10 includes a main housing 12 of insulating material having an integral hand grip 14. A chuck 16 is located at the front of the tool and holds a stud 18 during the welding operation. The chuck 16 is surrounded by a suitable spark shield 20 attached to a welding foot 22 which is held on supporting legs 24.

The chuck 16 is attached to a chuck leg 26 which includes a connection 28 forming a loading chamber 30, and an air cylinder 32. A plunger 34 in the cylinder 32 is connected by a piston rod 36 to a stud piston 38 which moves studs forwardly through the loading chamber 30 and into the chuck 16 when air is supplied to the rear of the cylinder 32 through a line 40. When the air is vented, a return spring 42 retracts the piston.

The air cylinder 32 is connected to a cable clamp 44 slidably supported in a forward portion of the body 12 which is closed off by a front end wall 46. Welding current is supplied to the clamp 44 through a main welding cable 48 which supplies welding current through the chuck leg 26 to the chuck 16 and the stud 18. A solenoid core 50 connected to the cable clamp 44 extends rearwardly into a lifting and holding coil 52. The core 50 is retracted when current is applied to the coil 52 with the rearward movement of the core 50, which determines the extent of the lift of the chuck 16 and the stud 18, determined by an adjustable core piece 54. A return or plunge spring 56 returns the chuck and the stud to the workpiece when the current to the coil 52 is shut off. If the length of the stud 18 to be welded varies excessively from stud to stud, it may be necessary to employ a clutch arrangement to enable constant lift to be attained, as is known in the art.

The studs 18 are fed automatically one at a time to the loading chamber 30. For this purpose, a flexible conveying tube 58 is connected to a bracket 60 mounted on the supporting legs 24 and communicates with a rigid supply tube 62 which directs the studs into the chamber 30 from a diagonally-rearward direction. The studs fed to the conveying tube 58 can be supplied from a source 64 shown in the form of a vibratory hopper having an inclined spiral track 66 up which the studs 18 are moved and oriented in a known manner. The studs are moved longitudinally into a supply tube 68 in which they are fed by gravity to an escapement mechanism 70 embodying the invention. The escapement 70 moves one stud at a time into alignment with the conveying tube 58 and then causes the stud to be blown through the tube 58 to the loading chamber 30.

The escapement mechanism 70, as shown in FIG. 2, includes a housing 72 having an upper opening 74 receiving a fitting or connector 76 connected to the supply tube 68. The housing 72 has a lower opening 78 receiving a fitting 80 to which the conveying tube 58 is connected. The escapement mechanism 70 also has a central transfer chamber 82 in which is slidably received a carrier 84 having first and second transverse passages 86 and 88. The carrier 84 is moved between two extreme positions in the chamber 82 by a pneumatic ram 90 located outside one end of the housing 72 and suitably affixed thereto. A threaded piston rod 92 of the ram is fastened to the carrier 84 by a connector 94. In the extreme left hand position of the carrier 84, as determined by an adjustable stop 95, the first transverse passage 86 is aligned with the supply tube 68 and the second transverse passage 88 is simultaneously aligned with the conveying tube 58, as shown in FIG. 2. The extreme right hand position of the carrier 84, as shown in FIG. 3, is determined by the connector 94 abutting the end of the housing 72. In this position, the first transverse passage 86 is aligned with the conveying tube 58 and the second transverse passage 88 is located to one side thereof. When no fluid or air is supplied to the ram 90, the carrier 84 is in the extreme right hand position by virtue of a conventional return spring in the ram acting on the cylinder or plunger therein.

The studs 18 are fed one at a time into the first transverse passage 86 by a detaining assembly 96. The assembly 96 includes a stop plunger 98 which extends into one of a lower opening 100 and an upper opening 102 in the fitting 76. The plunger 98 is operated by a second pneumatic ram 104 which causes, by means of a piston rod 106, the plunger 98 to move through the opening and into a supply passage 108 in the fitting 76 and thereby clamp or squeeze one of the studs 18 between the end of the plunger and the sidewall of the passage 108 opposite the plunger.

The plunger 98 and the ram 104 are mounted in a positioning block 110 having a pair of fastener openings 112 located near one edge thereof and adapted to receive fasteners 114 which are turned into openings 116 in a flat surface 118 of the fitting 76. For this arrangement, the block 110 can be fastened to the surface 118 with the plunger 98 extending into the lower opening 100, as shown in FIG. 2. In this position, a cylindrical locating projection 120 of the block 110 extends into a lower recess 122 of the fitting 76 concentric with the opening 100. Similarly, the block 110 can be turned 180° with the fasteners 112 in the openings 116 but with the projection 120 now extending into an upper locating recess 124.

This arrangement enables the escapement mechanism 70 to accommodate two different ranges of stud lengths. Solely by way of example, the plunger 98 when in the lower opening 100 can accommodate studs ranging from ⅜ inch to ½ inch in length. In such an instance, the opening 100 is located from the top of the carrier 84 by a distance less than twice the length of the shortest stud, or ¾ inch, and more than the length of the longest stud, or ½ inch. With the lower opening being between ½ and ¾ inch from the upper surface of the carrier 84, the plunger 98, when energized, will always engage an intermediate portion of the second of the studs 18 in the passage 108 and the supply tube 68.

Similarly, the upper opening 102 is spaced from the upper surface of the carrier 84 by a distance which is less than twice the length of the shortest stud to be used in another range of studs, and more than the length of the longest stud to be used. Again by way of example, for studs ranging in length from ⅝ inch to 1 inch, the distance of the upper opening 102 from the carrier will be less than twice the length of a ⅝ inch stud, or 1¼ inches, and more than the length of the longest stud, or 1 inch. Hence, the upper opening will be more than 1 inch and less than 1¼ inches from the upper surface of the carrier 84, in this instance. Of course, with studs of varying length, the stud welding tool must be adjusted or changed particularly for extreme ranges of length, or the tool can incorporate clutch elements, as previously mentioned, for small variations in length.

In the operation of the supply system, the studs 18 are fed continuously to the supply tube 68 by the source 64 and fill at least a substantial part of the supply tube 68, always being present in the passage 108. When no air is supplied to the rams, the components are in the position shown in FIG. 3, in which case the studs in the passage 108 rest on the upper surface of the carrier 84. When air is supplied to the rams, the carrier 84 is moved to its left hand position, as shown in FIG. 2, and the plunger 98 is energized to squeeze the second stud in the line againts the opposite side of the supply passage. The first stud in the line will then drop into the first transverse passage 86 with the second held by the plunger. At this time, air will also be supplied through an air outlet 126 located in the housing 72 opposite the opening 78. This air supplied through the opening 126 will convey any previously deposited stud through the conveying tube 58 and to the loading chamber 30. Air is then supplied to the cylinder 32 to cause the plunger 34 to move the piston 38 forwardly and position the stud 18 at the end of the chuck 16.

When the air is shut off, the carrier 84 is returned to the right hand position, as shown in FIG. 3, and the plunger 98 also is released to enable the clamped stud to drop down on the upper surface of the carrier 84. At this time, the stud in the passage 86 moves into alignment with and is dropped into the tube 58 where it rests in a lower portion of the tube until the carrier again is moved to the left hand position and air is blown through the opening 126 again to convey this stud into the loading chamber 30.

By using the clamping or squeezing action to control the studs in the supply tube, it is immaterial whether the studs have heads or not and the length of the studs and the shape of the ends thereof also is not important.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. Apparatus for supplying elongate fasteners to a fastening tool, said fasteners being of uniform length but subject to change in length from time to time when fasteners of different lengths are required, said apparatus comprising means forming a supply passage, means for feeding the elongate fasteners in end-to-end relationship into said passage, a conveying tube in which the fasteners are moved one at a time to the fastening tool, an escapement mechanism including a housing, a carrier slidably supported in said housing for reciprocatory movement therein, said carrier having at least one transverse passage, said housing having an inlet opening communicating with said supply passage, said housing having an outlet opening communicating with said conveying tube, means for moving said carrier between two positions with said transverse passage aligned with said inlet opening in one position and with said transverse passage aligned with said outlet opening in the second position, a plunger, means supporting said plunger transversely to said supply passage at a distance from the nearest surface of said carrier which is less than twice the length of the fastener to be supplied and more than the length thereof, means for operating said plunger to clamp an intermediate part of a second fastener from said carrier against the opposite side of said supply passage, means for energizing said moving means to move said carrier from one position to the other to receive the first fastener, means for energizing said operating means to move said plunger to clamp the second fastener, and positioning means associated with said supporting means for moving said plunger and said operating means to at least two different positions spaced longitudinally along said supply passage to enable said plunger to engage an intermediate part of the second fastener even when a change is made to fasteners of different lengths.

2. Apparatus acording to claim 1 wherein said plunger-operating means includes a pneumatically-operated ram.

3. Apparatus according to claim 1 characterized by said supply pasage means having transverse openings on opposite sides thereof to receive fastener means, and fastener means extending into said passages and connected with said plunger-operating means for removably affixing said plunger-operating means to said supply passage means.

References Cited

UNITED STATES PATENTS

| | | | |
|---|---|---|---|
| 2,534,140 | 12/1950 | Moore | 221—278 X |
| 2,662,626 | 12/1953 | Graham et al. | 221—278 X |
| 3,099,120 | 7/1963 | Brunn | 221—278 X |
| 3,161,274 | 12/1964 | Lanz | 221—278 |
| 3,163,324 | 12/1964 | Lupo | 221—278 |
| 3,175,240 | 3/1965 | Hillard | 221—278 |
| 3,182,819 | 5/1965 | Groom | 221—175 X |

FOREIGN PATENTS

| | | |
|---|---|---|
| 686,750 | 1/1940 | Germany. |

WALTER SOBIN, *Primary Examiner.*